March 24, 1925.                                              1,530,747
F. B. WYATT
MOTION PICTURE MACHINE
Filed May 20, 1922          3 Sheets-Sheet 1
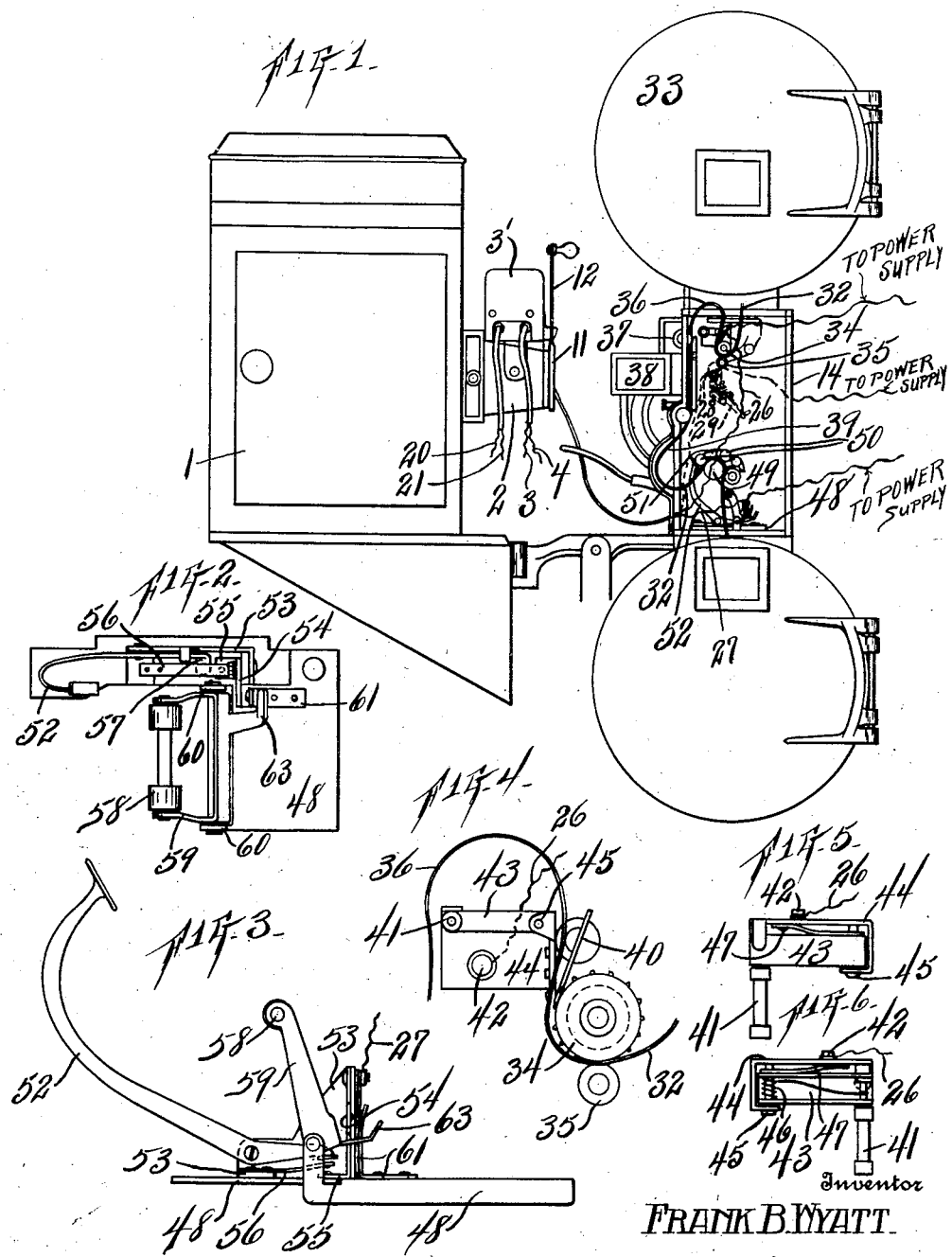

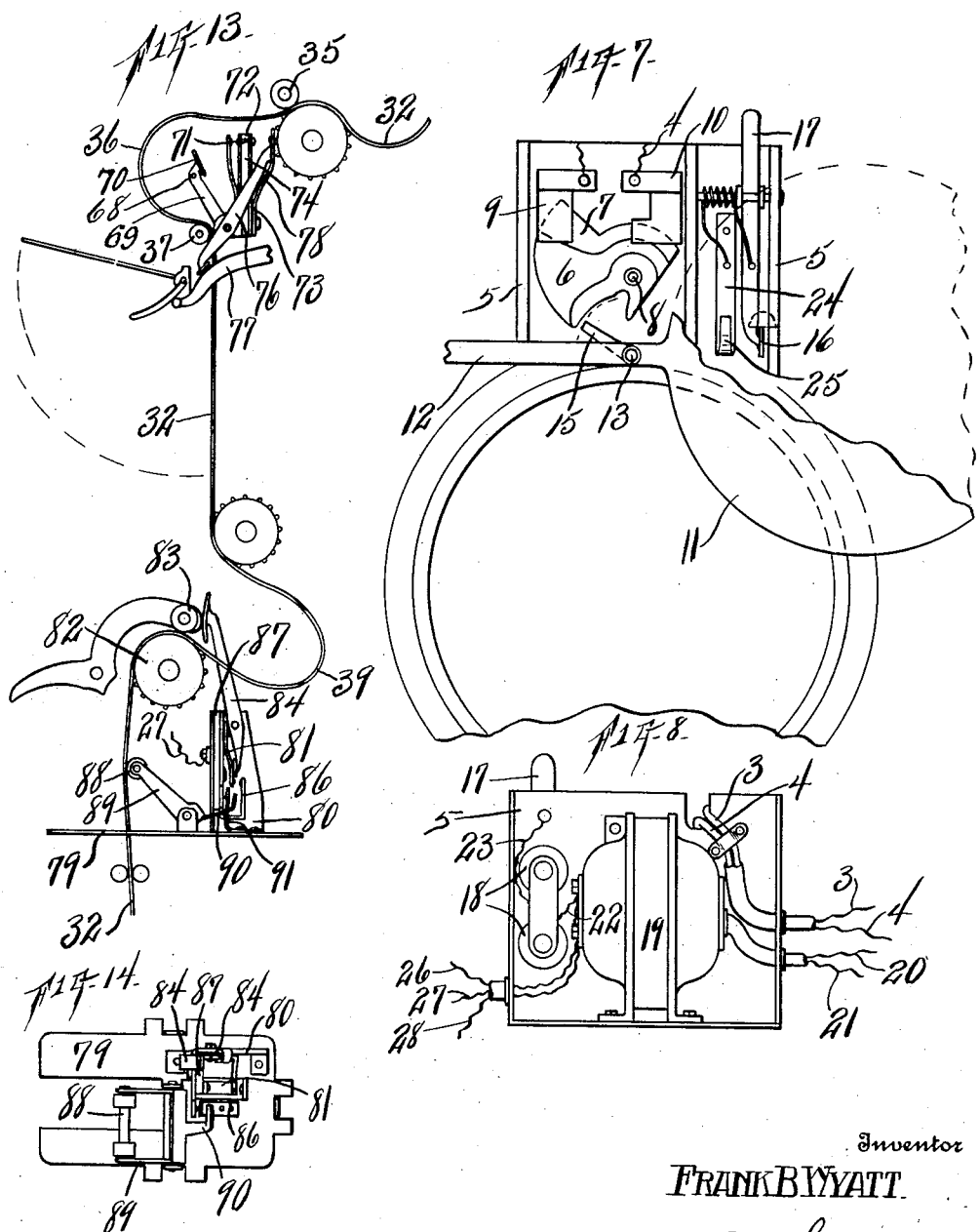

March 24, 1925.
F. B. WYATT
MOTION PICTURE MACHINE
Filed May 20, 1922
1,530,747
3 Sheets-Sheet 3
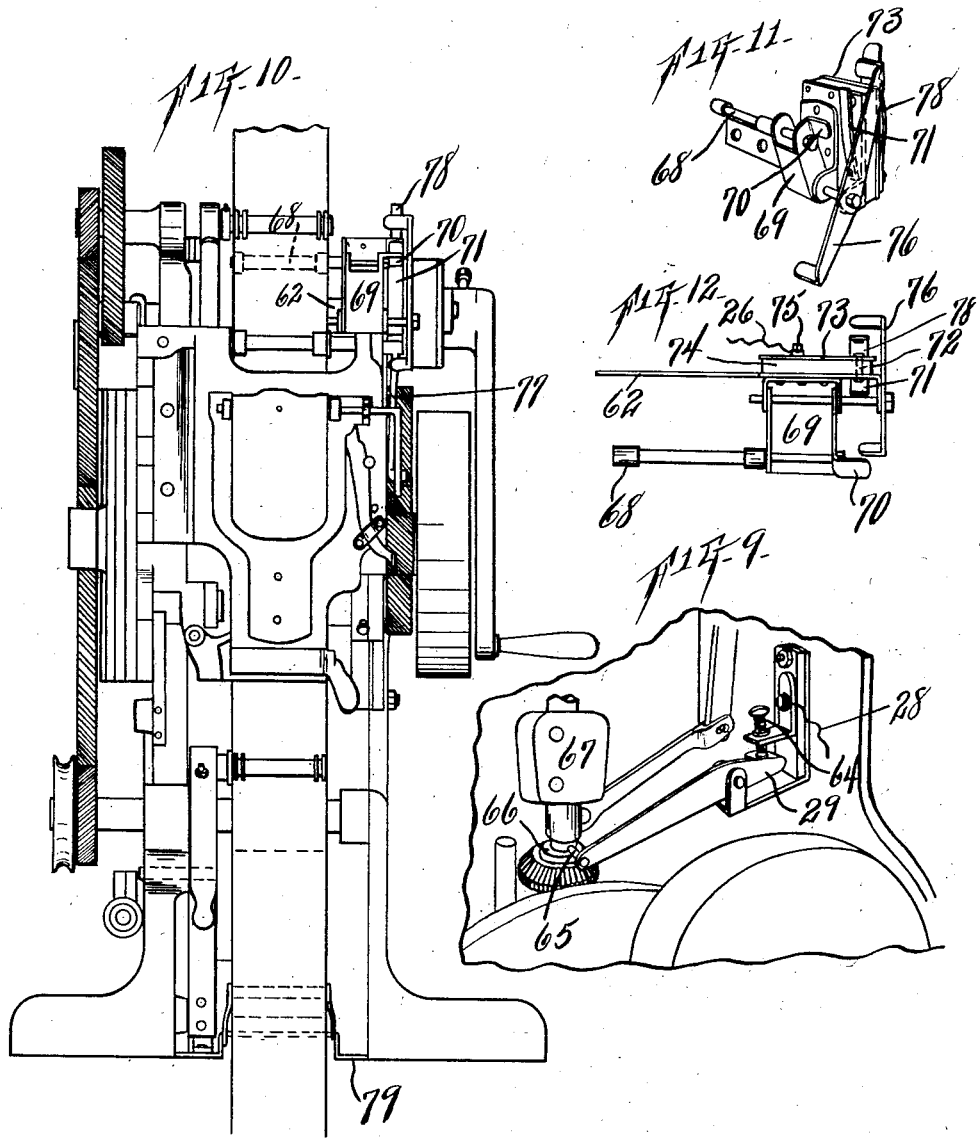
Inventor
FRANK B. WYATT
By A. L. Jackson
Attorney Patented Mar. 24, 1925.

1,530,747

UNITED STATES PATENT OFFICE.

FRANK B. WYATT, OF FORT WORTH, TEXAS.

MOTION-PICTURE MACHINE.

Application filed May 20, 1922. Serial No. 562,279.

*To all whom it may concern:*

Be it known that I, FRANK B. WYATT, a citizen of the United States, residing at Fort Worth, in the county of Tarrant and State of Texas, have invented certain new and useful Improvements in Motion-Picture Machines, of which the following is a specification.

This invention relates to improvements in motion picture machines and more particularly to certain safety devices for motion picture machines; and the object is to provide certain attachments distributed at different parts of a motion picture machine which do not materially change the machine to which they are applied nor in any manner affect the perfect action or operation of the machine as designed and constructed by the manufacturer; to provide devices for intercepting the light beam at the lamp house (or other place) and stopping the driving mechanism of the projector automatically and instantly when the film breaks or when the belt breaks or is thrown off, or when the machine drops below safe speed, or when holes are torn out so that the film does not feed past any sprocket wheel, or when the loop either above or below the aperture is lost, or when the machine is being threaded up, or when power is cut off from the motor circuit, or when the wiring is shorted, or when the film runs out. The advantage of such attachments is that under any of these conditions, the action of the attachments is instantaneous, operating in a very small fraction of the time required to ignite the film and the action is automatic and absolutely independent of any assistance or attention of the operator. The advantages of such quick and independent action are that the improvements eliminate the possibility of fire in the projector and they make the work of the operator less hazardous and enable him to operate several machines with ease and safety. Other objects and advantages will be fully explained in the following description and the invention will be more particularly pointed out in the claims.

Reference is had to the accompanying drawings which form a part of this application.

Fig. 1 is a diagrammatic view of the lamp house and machine in part, the side of the machine being removed. Fig. 2 is a plan view of the switch actuated by the lower loop of the film and the switch actuated on the breaking or running out of the film. Fig. 3 is a side elevation of the same. Fig. 4 is a side elevation of the control switch for the upper loop of the film. Fig. 5 is a plan view of the switch. Fig. 6 is an inverted plan view of the same. Fig. 7 is a front view of the shutter or dowser control mechanism and of the switch for controlling motor current. Fig. 8 is a rear elevation of the shutter or dowser control without the lamp house. Fig. 9 is a perspective view of the governor-controlled switch. Fig. 10 is a diagrammatic view of the improvements as adapted for use on a different machine from the machine shown in Fig. 1. Fig. 11 is a perspective view of the governor-controlled switch and also of the film-controlled switch for the upper loop. Fig. 12 is a plan view of the same, showing both switches. Fig. 13 is a diagrammatic view of the switches controlled by the upper and lower film loops and the switch actuated on the breaking or running out of the film and the governor-controlled switch. Fig. 14 is a plan view of the lower switch mechanism shown in Fig. 13.

Similar characters of reference are used to indicate the same parts throughout the several views.

The drawings show a lamp house 1 provided with the usual cone 2. A housing 5 is mounted on the cone 2. The drawings show the machine frame 14 opposite the lamp house. The switch mechanism is enclosed in a frame or insulated container 5 on the lamp house. A switch block 6 carries a knife switch 7 and this block 6 is pivotally mounted at 8, and its construction and operation is such that in opening the light to the film a slight movement of the shutter or dowser closes the motor circuit and the film moves safely before the light beam is permitted to strike it. One wire 3 is connected to the contact 9 and the other wire 4 of the circuit is connected to the contact 10. The wires 3 and 4 are connected to the power supply of electricity, one of the wires running through the motor which operates the machine. The shutter or dowser 11 is provided with a handle 12 and is rigidly mounted on the pivot bolt 13 which is pivotally mounted in the frame 5. The bolt 13 carries a lug 15 rigid therewith and when shutter or dowser falls, the lug 15 will actuate the block 6 and draw the knife switch 7 out of the contact 9. The shutter or dowser is supported and held open by a lug 16 which projects from the armature 17. The armature 17 is the armature of the magnetic coils 18. The current wires are connected to the transformer 19 for reducing the power of the current and the coils 18 are electrically connected to the transformer 19. The shutter or dowser will be held up in the position indicated in Fig. 7 until the magnets 18 are energized. The wires 20 and 21 are the current wires connected to a power source of electricity and to the transformer 19 for reducing the power. A wire 22 leads from the transformer 19 into the coils 18 and a wire 23 leads out of the coils 18 to the armature 17 and is electrically connected therewith and the current is grounded in the shutter or dowser 11 by means of the lug 16 which stands in contact with the shutter or dowser when the machine is operating. To make the connection of the coils with the shutter or dowser secure, there is a metal strip 24 in electrical connection with the wire 23 and a spring foot 25 bears against the shutter or dowser 11 which is of metal. The current through the magnet 18 and the transformer stands interrupted while the machine is in operation and the current is only established by some accident to the machine, as hereinafter set forth. When an accident occurs, the current will be established through the magnet and the magnet will be energized and the armature support will be withdrawn from the shutter or dowser 11 so that the shutter or dowser will drop and cut off the light from the projector.

There are three wires 28, 26 and 27 which run from the transformer 19. These wires lead respectively to the governor-controlled switch 29, to the switch 43 for the upper loop of the film, and to the switch 56 for the lower loop of the film.

The film 32 is housed in the casing 33 and passes rollers 34 and 35 and then the upper loop 36 is formed and the film passes roller 37. The roller 34 is provided with teeth for feeding the film to the machine. The roller 35 bears the film against the roller 34. The roller 37 is a flanged roller and guides the film past the light aperture 38 and a lower loop 39 is formed below the light aperture. After the film leaves the sprocket roller 34, being stripped from the roller sprocket 34 by a stripper 40, the film operates with a loop 36 and this is the normal position of the film during operation. If, through some accident, the loop 36 is lost, the film comes down against the roller 41 and presses this roller down until the contact is made and a circuit closed through a contact point 42. The roller 41 is supported in an arm 43. The arm 43 is mounted in a bracket 44 which is attached to a stationary part of the machine. The arm 43 is mounted on a pivot bolt 45 and is normally held in the elevated position by a spring 46 which is attached to the bracket 44 and is coiled around the bolt 45 and extends under the arm 43 and sustains the arm in the elevated position and is thus held yieldingly up against the bottom of the arm 43. A leaf spring 47 is attached to the side of the arm 43 and is adapted to slide on the bracket 44 and come down and make contact with the binding post 42 which is insulated from the bracket 44 and projects therethrough. The wire 26 is connected to the binding post 42. This connects the switch to the transformer 19. The other arm of the circuit is grounded on the bracket 44 and the machine frame. As long as the machine is operating in the required manner, the arm 43 is standing in the position shown in Fig. 4. If, by some accident to the film, the loop should be lost, the film will draw the arm 43 down until the spring 47 comes in contact with the binding post 42 and establishes a circuit through the transformer 19 and magnet 18. This will release the lug 16 from the shutter or dowser 11 which will fall and shut off the light.

The switch mechanism controlled by the bottom loop 39 is shown in Figs. 1, 2, and 3. A bracket 48 is attached to the machine frame 14. The film 32 is fed through the lower part of the machine by a sprocket wheel 49 and the film is held down on the sprocket wheel by rollers 50 which are carried by an arm 51. The arm 51 bears against a lever 52 which is fulcrumed on the bracket 53 which is attached to the bracket 48. A contact member 54 is attached to the upstanding part of bracket 53 and insulated therefrom and this contact member has a flange 55 at the bottom, forming a contact for the spring contact member 56 which is attached to the brackets 48 and 53. The lever 52 has an arm 57 which extends under the spring 56 and normally holds this spring out of contact with the member 55. The arm 51 bears against the lever 52 during the normal operation of the machine and so holds the spring 56 out of contact with the contact member 55. If the loop 39, the lower loop of the film, is lost, the film will lift the arm 51. The spring 56 will then yield to go back to the unstrained condition and so come in contact with the member 55, establishing a circuit by means of wire 27 with the transformer 19 and magnet 18. Then armature 17 will release the shutter or dowser and the shutter or dowser 11 will fall and cut off the light from the machine.

Another switch mechanism is mounted on the bracket 48. A roller 58 is journaled loosely in a pivoted bracket 59 which is pivotally mounted in arms 60 which are struck up from the bracket 48. A contact member 61 is mounted on the bracket 48. The pivoted bracket 59 carries an arm 63 which is adapted to engage the contact member 61 and to press the same against the contact member 54. During the normal operation of the machine the roller 58 will stand in the position shown in Fig. 3. If the film should break or be used up or pass entirely through, the roller 58 will drop downwardly and cause the arm 63 to engage the member 61 and close a circuit by means of wire 27 with the transformer 19 and the magnet 18 and thus release the shutter or dowser 11 and cut off the light from the machine.

The governor-controlled switch 29 is illustrated in Fig. 9. An adjustable contact 64 is provided to be adjusted to the throw of the lever 29. The switch lever 29 is pivotally mounted on the machine with one end located under the contact point 64. The other end of the switch lever 29 has an arm 65 which lies on a collar 66 which is actuated by the governor 67. When the governor expands and rises during the running of the machine, the contact is broken and remains broken while the machine is running at safe speed. If the belt is thrown off or the machine stops or slows down, the governor will descend and throw the switch lever 29 against the contact 64. This will close the circuit through the transformer 19 and magnets 18 and the magnets will cause the shutter or dowser to intercept the light beam. The circuit is closed through wire 28.

Certain variations are shown in Figs. 10 to 13 inclusive. The improvements are capable of use with different types of machines. The improvements are applied to a machine shown in Figs. 10 to 13 which is different from the machine previously shown. There is no change in the mechanism operating the shutter or dowser and the motor control switch. The switch mechanism for the upper loop and the governor-controlled switch are combined. During normal operation of the machine, roller 68 which is loosely journaled in a pivoted arm 69 pivotally mounted on bracket 62 hangs out of contact and within the upper loop of the film in such position that if the upper loop is lost the film will draw down on roller 68 and press extension 70 of arm 69 against contact spring 71 causing it to close the circuit through contact rivet 72 with member 73, which carries the binding post 75 to which current wire 26 is connected, thus closing the circuit through transformer 19 and energizing magnets 18 which will actuate armature 17 to release the shutter or dowser and shut off the light from the projector.

During the normal working of the machine, the governor-controlled switch 76 rests against the governor arm 77 which holds the switch against a spring contact member 78 and so holds this spring out of contact with member 73. When the machine slows down or stops the governor arm 77 releases the switch 76 so that the switch 76 will yield and let the spring 78 contact with member 73 and thus close a circuit through the wire 26, as above described, and cause the shutter or dowser 11 to shut off the light from the projector.

For lower loop 39 mechanism, a bracket 79 is attached to the machine and an upright bracket 80 is formed on the bracket 79. A spring contact member 81 is attached to bracket 80. A sprocket wheel 82 pulls the film through the machine and a roller 83 bears down on the film and at the same time the arm carrying roller 83 bears against the switch 84 which is pivotally mounted on the bracket 80 and the switch 84 holds the spring 81 out of contact with the contact member 86. If the loop 39 is lost, the film will throw the roller 83 out of working position and thus release the switch 84 and the switch 84 releases the spring 81 which will then make contact with the contact member 86 to which the wire 27 is electrically connected, the contact member 86 being supported on the insulation 87. This action will close a circuit through the transformer and magnets as above described.

During the normal working of the machine, the film supports a roller 88 which is mounted in a bracket 89 which is pivotally mounted on a bracket 79. An arm 90 is formed on the bracket 89 and is normally held out of contact with the contact member 86. If the film breaks or gives out the bracket 89 will drop and this will let the arm 90 come in contact with the spring 91 and press this spring against the contact member 86 and thus close a circuit through the same wire 27, and the action will be as before described.

Various changes in the sizes, proportions, construction and arrangement of the several parts may be made without departing from my invention. This invention is an improvement on the devices shown in Patent No. 1286874 Dec. 3, 1918 of which I own the entire right, title and interest.

What I claim, is:

1. In a motion picture machine provided with projector and film-carrying means electrically connected with a power for actuating same, a lamp house containing a source of light and means to project said light through the film in said projector; an insulated housing on said lamp house enclosing a motor circuit, contacts operatively connected to said circuit in said housing, a switch block in said housing carrying a switch adapted to engage said contacts, a dowser, a shaft for said dowser journaled in said housing and provided with means for actuating said switch block, a transformer, circuits in said projector electrically connected to said transformer normally broken, means in said projector for closing said circuits in case of accident or irregularities in operation of said projector or the film, a magnet electrically connected to said transformer and provided with an armature operatively connected to said dowser for holding it out of light intercepting position during normal operation of the projector and releasing it when any circuit in the projector is closed.

2. A motion picture machine having a projector and means for moving a film therethrough, a lamp house and a dowser therefor, electric circuits in said projector normally broken, means in said projector for closing said circuits in case of accident or irregularities in operation, a switch housing on said lamp house, a motor circuit and contacts in said housing operatively connected to said circuit, a switch block pivotally mounted in said housing and carrying a switch normally engaging said contacts and provided with a notch therein, a transformer and wires connected thereto for connection with a power source of electricity, a magnet operatively connected to said transformer and to said dowser, a shaft for said dowser, journaled in said housing and provided with a lug rigid therewith and adapted to engage said notch for actuating said switch block, switches in said projector and wires operatively connected to said switches and to said transformer and a magnet for releasing said dowser in case of accident or irregularities.

3. A motion picture machine provided with a projector and means for moving a film therethrough, said film having the usual loops, a lamp house, a switch housing on said lamp house, a motor circuit connected through said housing, a switch in said housing forming a part of said circuit and normally closed, an electrically-controlled dowser adapted to actuate said switch for cutting off the light of said lamp house from said projector, contact making devices in said projector adjacent to and normally out of contact with the film but adapted to be closed by direct action of the film (when a loop is drawn out of the film) for causing release of said dowser and means actuated by said dowser for opening said motor circuit switch.

4. In a motion picture machine provided with a projector and means for moving a film therethrough and maintaining loops in the film above and below the light aperture, a lamp house; a switch housing on said lamp house and insulated therefrom, a motor circuit connected through said housing, a switch in said housing forming a part of said circuit and normally closed, a dowser pivotally mounted on said housing and electrically-controlled means for normally holding said dowser in open position, mechanical means adapted to be actuated by said dowser for opening and closing said switch and contact making devices in said projector operatively connected with said electrically-controlled means and normally out of contact with said film and normally open but adapted to be closed by direct action of the film (when a loop in the film is lost) for releasing said dowser and breaking the motor circuit.

5. In a motion picture machine provided with a projector means for moving a film therethrough and maintaining loops in the film above and below the light aperture, and a lamp house; a switch housing on said lamp house and insulated therefrom, a motor circuit connected through said housing, a switch in said housing forming a part of said circuit and normally closed, a dowser pivotally mounted on said housing and electrically-controlled means for normally holding said dowser in open position, mechanical means adapted to be actuated by said dowser for opening and closing said switch, and contact making devices in said projector including a swinging arm projected in a loop of the film and operatively connected with said electrically controlled means and normally out of contact with the film and normally open but adapted to be closed by direct action of the film (when a loop is lost in the film) for releasing said dowser and breaking the motor circuit.

6. In a motion picture machine provided with a projector and means for moving a film therethrough and maintaining upper and lower loops in the film, and a lamp house; a switch housing on said lamp house and insulated therefrom, a motor circuit connected through said housing, a switch in said housing forming a part of said circuit and normally closed, a dowser pivotally mounted on said housing and electrically-controlled means for normally holding said dowser in open position, mechanical means to be actuated by said dowser for opening and closing said switch, an electric switch in said projector operatively connected with said electrically-controlled means normally out of contact with said film but adapted to be closed by said film for releasing said dowser when the lower loop is lost, and a second switch utilizing the contact of the last named switch and normally held open by the film and adapted to be automatically closed for releasing the dowser, in case of irregularities in operation.

7. In a motion picture machine provided with a projector, and means for moving a film therethrough and maintaining upper and lower loops in the film, and a lamp house; a switch housing on said lamp house and a motor circuit connected therethrough, a switch in said housing normally closed and forming a part of said circuit, a condenser in said housing operatively connected in said circuit, a dowser mounted on said housing and electrically-controlled means including electromagnets and a transformer enclosed in said housing for normally holding said dowser in the open position, mechanical means to be actuated by said dowser for opening and closing said circuit, and a plurality of contact making devices in said projector operatively connected with said electrically-controlled means for releasing said dowser, all of said contact making devices normally standing open and out of contact with the film and any one of which adapted to be automatically closed by direct action of the film in case of accident or irregular operation of the film, thereby releasing the dowser to intercept the light beam and break the motor circuit to stop the movement of the film and the projector.

8. In a motion picture machine provided with a projector and means for moving a film therethrough, a film and a lamp house; a switch housing, a motor circuit connected through said housing, a switch in said housing forming a part of said circuit and normally closed, a dowser pivotally mounted on said housing and electrically-controlled means for holding said dowser in open position, mechanical means to be actuated by said dowser for opening and closing said switch, electric means in said projector including a stationary contact electrically connected to said electrically controlled means and a movable contact normally out of contact with said film but movable by direct action of said film in case of accident to engage said stationary contact for closing the circuit through said electrically-controlled means for releasing said dowser.

In testimony whereof, I set my hand, this 17th day of May, 1922.

FRANK B. WYATT.